March 18, 1930.  A. O. FORSTER ET AL  1,751,141

TRAP NEST

Filed June 30, 1924    4 Sheets-Sheet 1

Inventors.
Albert O. Forster.
Percy M. Forster.
By Dewey, Strong, Townsend & Loftus
Attorneys.

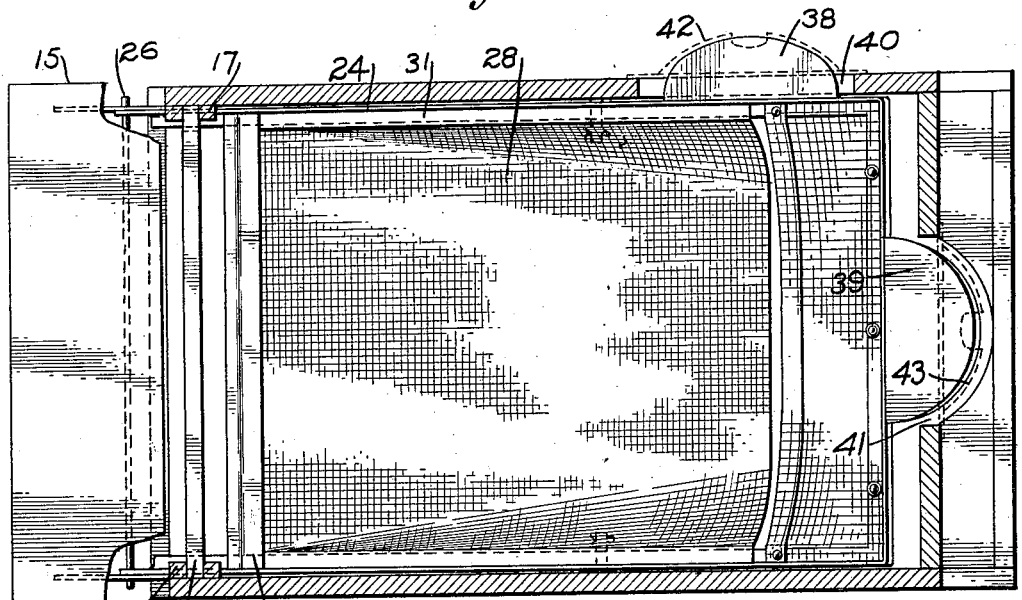
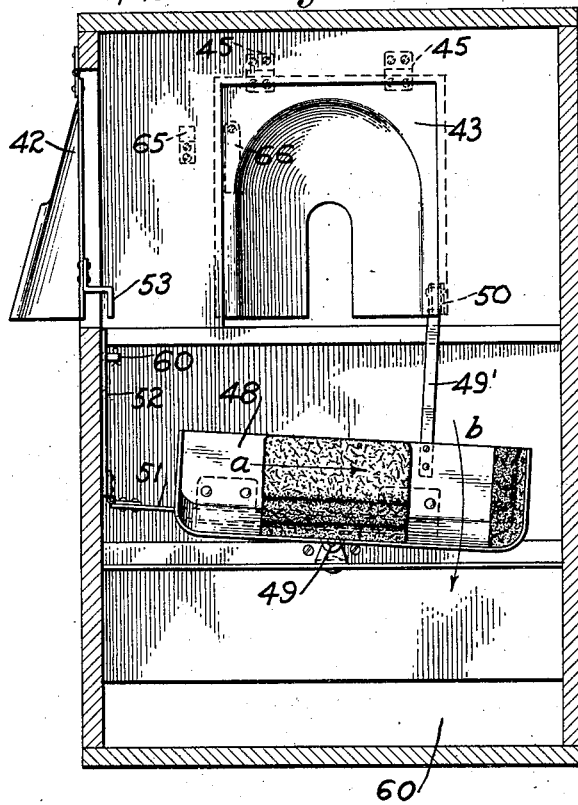
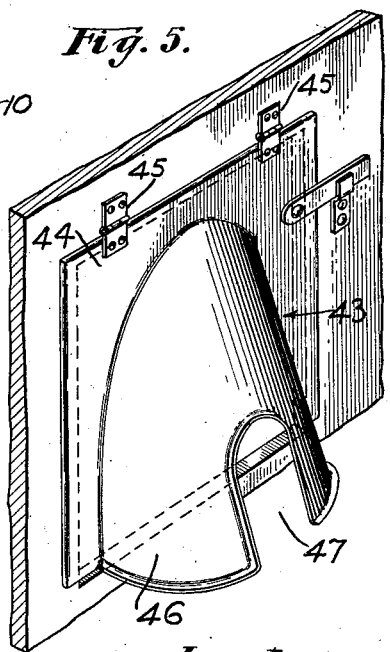

March 18, 1930.  A. O. FORSTER ET AL  1,751,141

TRAP NEST

Filed June 30, 1924     4 Sheets-Sheet 3

Inventors.
Albert O. Forster.
Percy M. Forster.
By
Attorneys.

March 18, 1930.  A. O. FORSTER ET AL  1,751,141
TRAP NEST
Filed June 30, 1924    4 Sheets-Sheet 4
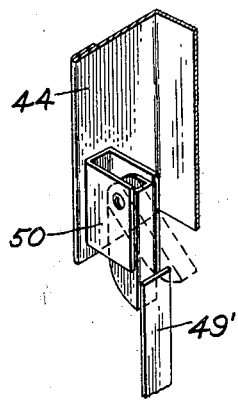
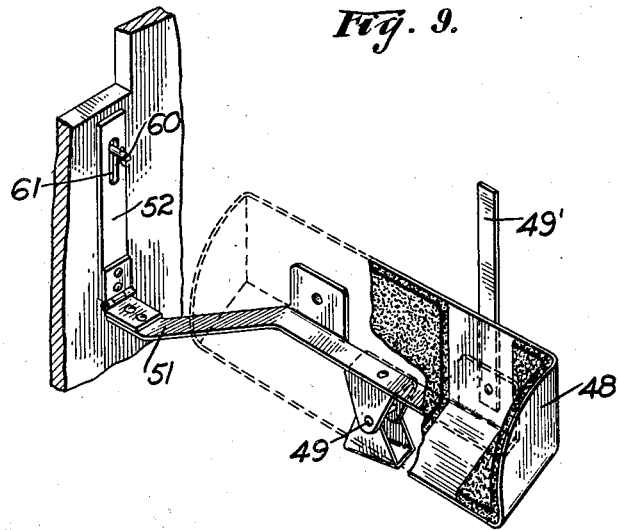
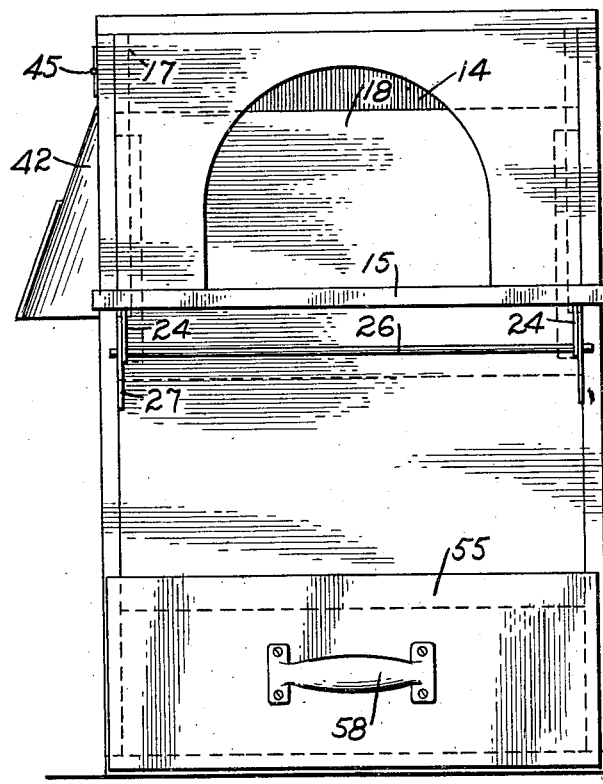
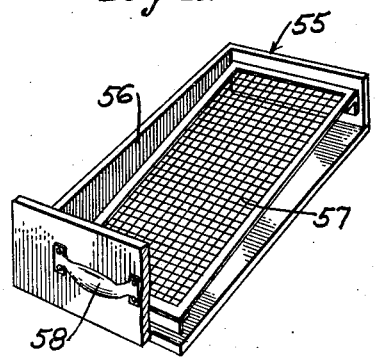
Inventors
Albert O. Forster.
Percy M. Forster.
By
Attorneys.

Patented Mar. 18, 1930

1,751,141

UNITED STATES PATENT OFFICE

ALBERT O. FORSTER AND PERCY M. FORSTER, OF BERKELEY, CALIFORNIA, ASSIGNORS OF ONE-FOURTH TO THOMAS I. FORSTER AND ONE-FOURTH TO TONY L. KELLY, BOTH OF BERKELEY, CALIFORNIA

TRAP NEST

Application filed June 30, 1924. Serial No. 723,099.

This invention relates to a trap nest, and particularly pertains to improvements in trap nests of the general class shown in our patent dated September 4, 1923, and bearing the No. 1,467,149.

The general object of the present invention is to provide a nest structure which may be automatically operated by the presence of a hen and the presence of an egg to segregate the laying and non-laying hens, thus insuring an accurate check to be made upon the productivity of the hens, and make it possible to readily eliminate the hens who are non-producers.

The present invention contemplates the use of a nest structure through which it is intended that every hen in a poultry yard shall pass each day, said structure embodying means whereby the non-laying hens will be automatically returned to the original poultry yard, and the laying hens will be automatically directed into a separate yard to which non-laying hens do not have access.

The present invention further contemplates means whereby the hen laying a particular egg may be accurately identified.

The invention is illustrated by way of example in the accompanying drawings, in which:

Fig. 3 is a view in horizontal section showing the entry and exit openings and their relation to each other.

Fig. 4 is a view in transverse vertical section through the structure as seen on the line 4—4 of Fig. 1, and with the nest removed for the sake of convenience.

Fig. 5 is an enlarged view in perspective showing one of the exit doors and the peculiar structure whereby a hen may readily open the door, this view further showing a latch adapted to be manually operated in order to trap a particular hen.

Fig. 8 is an enlarged view in perspective showing the latch by which one of the exit openings is normally locked.

Fig. 9 is a view in perspective showing the egg scale by which the exit openings may be alternately locked.

Fig. 10 is a view in front end elevation showing the entry opening and the egg drawer.

Fig. 11 is a small view in perspective with parts broken away showing the construction of the egg drawer.

Figure 1:
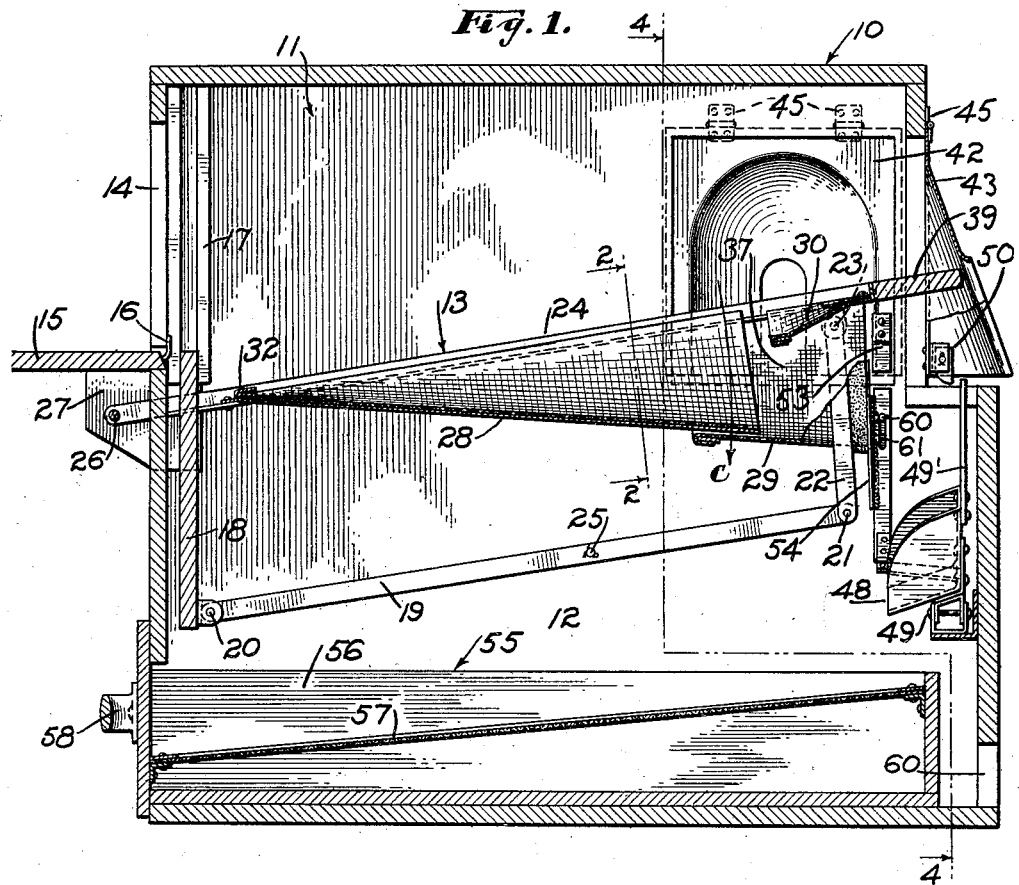
Fig. 1 is a view in central vertical section through the trap nest structure showing the details and arrangements of the various parts when the nest is unoccupied.
Figure 2:
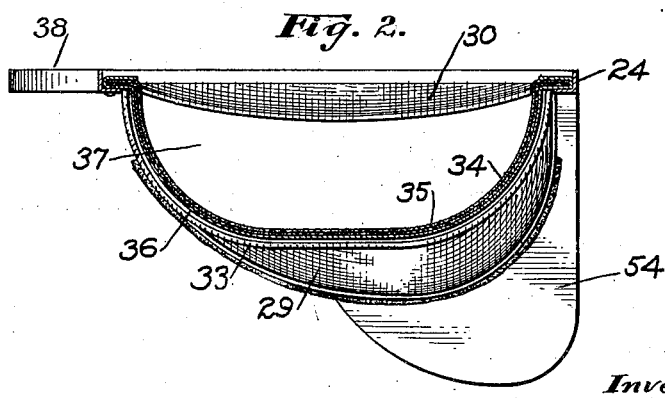
Fig. 2 is a view in transverse vertical section through the nest as seen on the line 2—2 of Fig. 1.

Referring more particularly to Fig. 1 of the drawings, 10 indicates a housing here shown as formed with an upper compartment 11 and a lower compartment 12. These compartments are divided horizontally by a nest structure 13 which will be more particularly described hereinafter.

An entry opening 14 is formed at the forward end of the upper compartment 11 of the housing and as shown in Fig. 10 of the drawings, has a semicircular archway of sufficient dimensions to permit a hen to readily pass into the housing. An entry platform 15 is mounted directly below the entrance opening 14 and is pivotally supported so that it may be swung upwardly to temporarily obstruct the entry opening without completely closing the same when it is intended that the trap nest shall remain inoperative.

Supporting fingers 16 are provided at the rear end of the platform 15 to maintain the platform in its horizontally disposed position when desired. Guideways 17 are disposed at opposite sides of the entry opening and receive a vertically reciprocable entry door 18. This door is normally lowered to an unobstructing position with its upper edge on the level with the horizontally disposed entry platform 15. The door is automatically operated by the weight of the hen which is on the nest 13. This is accomplished by levers 19 pivotally connected at 20 to the lower edge of the door 18 and at their forward ends at 21 to links 22. The links 22 extend upwardly along opposite sides of the nest structure 13 and are pivotally connected at 23 to the frame 24 of the nest. Intermediate pivots 25 pass through the levers 19 at points substantially midway the lengths of the levers, and thus provide that oscillation of the levers around their pivots 25 will cause coaction between the nest structure and the entry door 18.

It is to be understood that the nest structure 13 swings vertically from a pivot rod 26. This pivot rod is supported on bearings 27 disposed on the front of the housing 10 and beneath the platform 15 in its normally horizontal position. The nest structure, as more clearly shown in Fig. 6 of the drawings, comprises a U-shaped frame 24, the arms of which pass through openings in the end of the housing 10 and are engaged by the pivot shaft 26.

This frame is preferably formed of angle iron for strength and rigidity and carries a removable nest structure 28, a fixed nest structure 29, and a nest shield 30. The removable nest structure 28 is formed with a U-shaped frame 31, the transverse member of which fits beneath a cross bar 32 carried by the arms of the main nest frame 24. The nest structure carried by the frame 31 is substantially scoop shaped, that is, it is formed with vertical side walls and a floor which inclines from the cross member 32 of the main frame to the hoop 33 of the fixed nest section 29. The nest is intended to be substantially sanitary and permanent, and for that reason its walls are formed with an upper layer 34 of reticulated material such as fine mesh poultry wire, an intermediate layer 35 of burlap and an outer supporting wall 36 of sheet metal or fine mesh wire. The nest may thus be removed and cleaned without difficulty.

The permanent nest structure 29 fits beneath the forward and lowermost end of the removable nest 28 and comprises the hoop 33 which supports the forward end of the removable ends 28, and also supports the reticulated material forming the wall of a fixed nest structure. This reticulated material is of larger mesh than that used in the removable nest, so that any dirt and straw may readily fall through the wall, and will not accumulate in the nest.

The shield 30 is formed of reticulated material and is stretched across the end of the frame 24 opposite from the transverse member 32. This shield is disposed above the fixed shield and forms an opening 37 through which an egg may pass to the scales. The shield thus prevents the hen from stepping on the egg, and permits it to readily roll to the egg scale.

Figure 6:
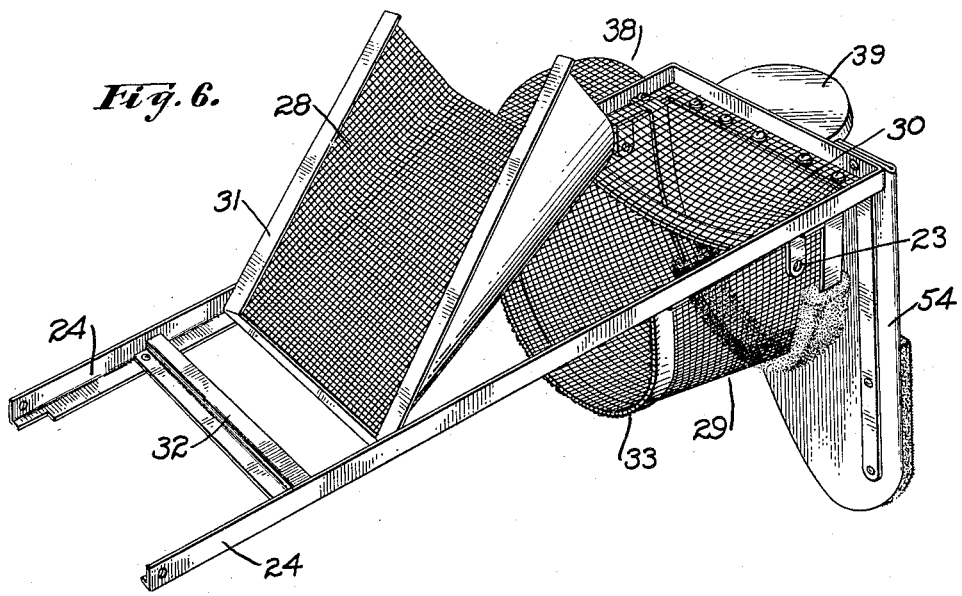
Fig. 6 is a view in perspective showing the complete nest structure with a removable nest section in a partially removed position.

By reference to Figs. 3 and 6 of the drawings, it will be seen that the frame 24 of the nest carries platforms 38 and 39. The platform 38 extends outwardly through what might be termed a non-laying exit opening 40, while the platform 39 extends outwardly through a laying exit opening 41. The non-laying exit opening is normally closed by a vertically swinging door 42, while the laying exit opening is normally closed by a vertically swinging door 43. These doors are of substantially the same construction as shown in details in Fig. 5 of the drawings.

After much study and experimentation, the doors of this design have been developed for the reason that they may be easily operated by the natural effort of a hen to free herself through an opening through which she can see light, and against the wall of which she may readily force her body.

As shown in Fig. 5, the doors are made of a sheet metal piece 44 mounted for vertical swinging movement upon hinges 45 disposed above the exit openings. The main body of the door is shaped to form a canopy 46 which is substantially in the shape of a half cone divided along its vertical axis. This canopy thus flares out at the bottom and in the center thereof and beginning at its bottom edge is an opening 47. This opening is of sufficient dimensions to permit a hen to thrust her weight out through the opening and to force against the side walls of the canopy 46 so that as she stands on one of the exit platforms 38 or 39, she may swing the associated exit door outwardly and upwardly, at which time the curved portion of the canopy will fit over her back and permit her to easily step from the platform and regain her freedom.

The doors 42 and 43 are provided with means whereby they may be locked, and in fact a mechanism is provided which alternately locks and unlocks the two doors. This mechanism is shown particularly in Figs. 7, 8 and 9 of the drawings, where it will be seen that an egg scale or trough 48 is mounted upon a horizontal pivot 49 at the exit end of the housing, and in a position to receive an egg from the permanent nest section 29. This trough is formed with a vertical and horizontal side having substantially closed ends so that the egg may be received near one end of the trough and will roll therealong until it reaches the opposite and lower end. The trough is normally in the position shown in Fig. 4 of the drawing, and when thus disposed will operate a lock finger $49^1$ to stand in an obstructing position in front of a pivoted detent 50 carried at a point along the lower edge of the laying exit door 43. The trough structure also carries an arm 51 to which is hinged a lock bolt 52 extending upwardly along the side wall of the housing and adapted to engage a lock finger 53 fixed to the lower edge of the non-laying exit door 42.

Figure 7:
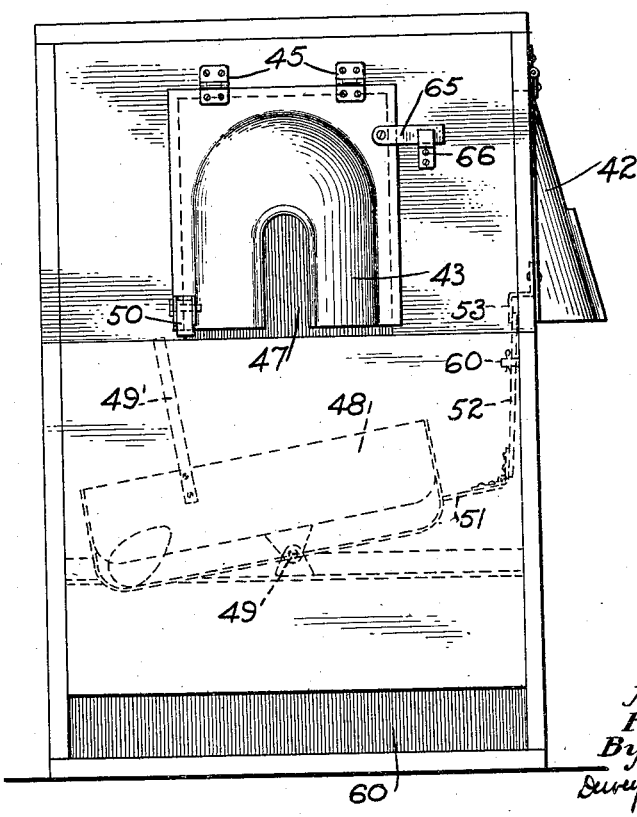
Fig. 7 is a view in elevation showing the exit end of the structure which leads into the "laying yard."

In Fig. 4 of the drawings, it is shown that the trough 48 is normally inclined so that an egg deposited thereon will move in the direction of the arrow —a—, and this, of course, will swing the trough around its pivot in the direction of the arrow —b— to the position indicated in dotted lines of Fig. 7. Swinging movement of the egg scale is limited by a pin 60 passing through a slot 61 in the lock bolt 52 as shown in Fig. 9.

It will be evident that at all times when the hen is on the nest, the nest will be held in its lowermost position, that is, with the frame 24 lying in a substantially horizontal plane, and that the entry door 18 will be held in its uppermost and closed position. Due, however, to the counterbalancing action of the door 18 through the levers 19, the removal of the weight of the hen from the nest will cause the weight 18 to swing the nest upwardly to its original position as shown in Fig. 1.

While the nest is occupied, and is thus swung to its lowermost position, its shield 54 will extend downwardly over the portion of the trough 48 from which an egg may roll, and will maintain the scales in the position shown by dotted lines in Fig. 7. The shield member 54 is so designed as to swing free of the egg trough 48 when the hen departs from the nest, and at that time, the egg is free to roll into an egg drawer 55, as shown in Fig. 11. This egg drawer is positioned at the bottom of compartment 12 of the housing, and has a rectangular frame structure 56 supporting an inclined false floor 57. This floor is preferably formed of reticulated material, so that any dirt, straw, or the like may fall through the false floor and will not remain with the eggs. The egg drawer may be withdrawn from the entry end of the housing by a handle 58.

In operation of the present invention, when it is desired to use the nest, the entry platform 15 is swung downwardly to its horizontal position as shown in Fig. 1. The entry door 18 will normally be in its lowermost and opened position, thus affording free access to the hen. The hen may now pass into the compartment 11 in the housing through the entry opening 14, and as she moves towards the light coming in through the exit opening in the housing and slots 47 in the doors thereof, she will so place her weight upon the nest structure 13 as to cause it to be overbalanced and to swing downwardly in the direction of the arrow —c— as indicated in Fig. 1 of the drawings. In thus doing, motion will be transmitted to the levers 19 and to links 22, thus overcoming the weight of the entry door 18 and projecting this door upwardly along its ways 17 to a closed position. It will then thus be seen that the hen will have automatically closed the entry door 18. At this time the exit doors will be in their normal positions; that is, the non-laying exit door 42 will be unlocked and the exit door 43 will be locked.

When the nest has been swung to its lowermost position, the forward opened end of the fixed nest section 29 will be in register with the uppermost end of the egg scale trough 48. If an egg is laid by the hen, this will roll down the inclined bottom of the nest and through the opening 37 beneath the shield 30 finding its way onto the uppermost end of the trough 48. The egg will gradually roll down along this trough and will be maintained thereon by the shield 54 carried by the swinging end of the nest structure. The egg, as it rolls down the trough and across the axis 49 will overbalance the trough and cause it to swing downwardly in the direction of the arrow —b— as indicated in Fig. 4, and to assume the position indicated by dotted lines in Fig. 7. While thus swinging downwardly the lock bar 49 will move from engagement with the pivoted detent 50 of the laying exit door 43, and the lock bolt 52 will swing upwardly to assume a position in front of the lock finger 53 carried on the non-laying exit door 42. The swinging movement of the trough and the upward movement of the lock bolt 52 will be limited by the length of the slot 61 in the bolt 52, and through which a limit pin 60 projects.

By this operation the doors will then be in a position to prevent the hen from passing back into the non-laying yard through either the entry opening 14 or the non-laying exit opening 40. The door 43 of the laying exit opening 41, however, will be unlocked so that the hen may pass into the laying yard. The hen will then try the two exit openings, and upon finding the door 42 locked, will thrust her head through opening 47 in door 43 and raise this door, walking out on the platform 39 as the door raises. When the hen leaves the exit platform the counterweight action of the entry door 18 will swing the free end of the nest structure in a counterdirection to that indicated by the arrow —c— in Fig. 1, and will thus place the nest in position to receive another hen while opening the entry door. This upward movement of the free end of the nest will also cause the shield 54 to clear the end of the egg trough 48 on which the egg is resting. When the egg is thus free to roll from the trough, it will pass onto the upper end of the inclined floor 57 of the egg drawer 55. The weight of the trough will then cause the trough to swing in an opposite direction from that indicated by arrow —b— in Fig. 4 so that lock bar 49 will move in the path of travel of the finger 53. The detent 50 has a rounded rear face so that in the event the lock bar $49^1$ moves to its uppermost positions before the laying exit door 53 swings to its closed position, the detent will ride over the upper end of the lock bar 49 and come to rest in a locking position with the bar in front of the detent, thus holding the door closed and locked.

In some instances it is desirable to identify the hen which is laying a particular character of egg, and for this purpose a latch structure is provided on the laying exit door 53. This comprises a swinging catch 65 pivotally mounted on the door and adapted to swing in a locked position relative to a hasp 66 carried on the housing. It will thus be seen that by the use of the structure here disclosed, laying and non-laying hens may be accurately separated by a mechanism entirely automatic in its action, simple in its construction, and not liable to get out of order, and which may be maintained in a clean and sanitary condition.

While we have shown the preferred form of our invention as now known to us, we wish it understood that various changes may be made in its construction without departing from the spirit of the invention as defined in the appended claims.

Having thus described our invention, what we claim and desire to secure by Letters Patent is:

1. A door for a doorway through which poultry may pass comprising hinge means for supporting the door for vertical swinging movement, a semi-conical upwardly tapered transversely curved apron formed as a part of the door and flaring outwardly in the direction in which the door is intended to swing, and an open-ended slot formed in the wall of said apron and through which a bird may thrust its head and apply its strength to the semi-conical wall to raise the door, said semi-conical apron conforming generally to the configuration of the body of the bird and facilitating the opening of the door and the passage of the bird.

2. In a trap nest, structure comprising a rigid frame having spaced sides provided with inwardly extending supporting leaves, a cross bar connecting the sides of the frame and having a projecting flange arranged in spaced relation with the supporting leaves, a permanent nest section secured at its upper edges to the supporting leaves of the frame and spaced from the cross bar, and a removable nest section detachably interlocked at one end with the flanged portion of the cross bar and supported by said leaves and overlapped at the other end with the permanent nest section.

3. In a trap nest, an entry opening, and a platform disposed in front of said opening and arranged to be swung upwardly to form a closure for the opening and provided with fingers projecting from the inner edge of the platform and extending interiorly of the trap nest and arranged to engage portions of the trap nest at opposite sides of the said opening to support the platform in a horizontal position and adapted to be withdrawn to permit the removal of the platform.

4. In a trap nest, a nest structure comprising a rigid frame having spaced side bars provided with inwardly extending supporting flanges and having extended pivoted ends, a permanent nest section formed of reticulated material and disposed at one end of said frame and secured at its upper edges to and supported by the said flanges, a removable nest section positioned in said frame between the fixed permanent nest section and the extended pivoted ends of the side bars and supported at its upper edges by the said flanges and forming a continuation of the fixed section, one end of the removable nest section being arranged in overlapping relation with the permanent nest section, and means located at the other end of the removable nest section for interlocking the same with the frame.

5. In a trap nest, a supporting frame having spaced side bars provided with inwardly extending flanges, a nest structure comprising a binding frame supported upon the said flanges, a wall formed of an upper layer of wire fabric and an intermediate layer of fabric, said layers being clamped in the binding frame, and an outer supporting layer carried by the binding frame, the latter being substantially U-shaped in cross section and clamping the said layers together in a unitary structure.

ALBERT O. FORSTER.
PERCY M. FORSTER.